United States Patent [19]

Sparks

[11] Patent Number: 5,663,508
[45] Date of Patent: Sep. 2, 1997

[54] SILICON FLOW SENSOR

[75] Inventor: Douglas Ray Sparks, Kokomo, Ind.

[73] Assignee: Delco Electronics Corporation, Kokomo, Ind.

[21] Appl. No.: 512,250

[22] Filed: Aug. 7, 1995

[51] Int. Cl.$^6$ ..................................................... G01F 1/28
[52] U.S. Cl. ..................................... 73/861.71; 73/861.74
[58] Field of Search ........................... 73/861.71, 861.74, 73/720, 726

[56] References Cited

U.S. PATENT DOCUMENTS

| | | | |
|---|---|---|---|
| 3,298,230 | 1/1967 | Stover | 73/861.74 |
| 3,340,733 | 9/1967 | Lasher | 73/861.74 |
| 3,722,264 | 3/1973 | Talmo et al. | 73/726 |
| 4,625,565 | 12/1986 | Wada et al. | 73/861.74 |
| 4,670,092 | 6/1987 | Motamedi | 73/720 |
| 5,131,265 | 7/1992 | Tobin et al. | 73/861.74 |
| 5,279,162 | 1/1994 | Takebe et al. | 73/726 |
| 5,319,980 | 6/1994 | Kremidas | 73/726 |

OTHER PUBLICATIONS

Flow Its Measurement and Control in Science and Industry—Volume Two 1981 St. Louis William W. Durgin Editor-in-Chief, Article E-706 entitled "Miniature Drag-Force Anemometer" by L. N. Krause and G. C. Fralick pp. 117–130.

Primary Examiner—George M. Dombroske
Assistant Examiner—Harshad Patel
Attorney, Agent, or Firm—Jimmy L. Funke

[57] ABSTRACT

A silicon flow sensor is provided having an uncomplicated design and construction, while also exhibiting a desirable level of sensitivity for use in automotive applications. The primary sensing component is preferably formed by a single silicon chip on which associated signal conditioning and compensating circuitry can be provided. The chip includes a base region from which a vane is cantilevered so as to be adapted to deflect in either of two directions when impinged by fluid flow. A beam region is present intermediate the vane and the base region on which a strain sensing element is present, such that strain occurring in the beam region as a result of vane deflection is sensed to indicate the degree to which the vane is deflected. The construction of the flow sensor is such that its sensitivity can be readily modified during its manufacture in order to optimize the sensor for its intended use.

19 Claims, 3 Drawing Sheets

SILICON FLOW SENSOR

This invention generally relates to sensors of the flow-sensing type. More particularly, this invention relates to a silicon flow sensor that can be readily up-integrated with other semiconductor sensors and processes, wherein the flow sensor is characterized by a rugged structure that is capable of surviving in hostile environments, yet whose sensitivity can be readily modified during processing of the flow sensor.

BACKGROUND OF THE INVENTION

Sensors are used in automotive and various other applications for a variety of purposes, such as sensing fluid or air pressure within an automotive fuel system and sensing motion as part of a passenger passive restraint system. A third type of sensor finding use in automotive applications is flow sensors, which serve such purposes as determining the flow rate of intake air to an engine. On the basis of reliability and cost, a trend in the automotive industry is to fabricate such sensors in the form of monolithic semiconductor sensors that are micromachined from silicon wafers.

The prior art has generally relied on flow sensors in the form of hot wire devices and pressure sensing diaphragms modified to detect air flow. Hot wire devices are generally polysilicon or metal runners formed on a silicon chip and indicate fluid flow by sensing the heat removed from the hot wire by the fluid, while pressure sensing diaphragms rely on a venturi effect as a fluid passes through an opening in the diaphragm to deflect the diaphragm, which can then be sensed by piezoresistive or capacitive techniques. While such flow sensor designs have found acceptance in the industry, their fabrication, size and complicated construction diminish their desirability and potentially their ruggedness for use in automotive applications. Such shortcomings can be exasperated by the presence of signal conditioning or processing circuitry on the same structure that supports the sensing element. Furthermore, these prior art sensor designs can be impractical for use in sensing flow in applications where the direction of fluid flow is not unidirectional, i.e., the fluid may reverse its direction of flow.

Therefore, it would be desirable to provide a semiconductor flow sensor that is relatively uncomplicated in its fabrication and construction, can be fabricated to have a monolithic structure on which signal conditioning and processing circuitry can be provided, and is characterized by an efficient use of material so as to minimize the size of the sensor. It would particularly be desirable if the sensitivity of such a flow sensor could be readily modified during fabrication in order to optimize the sensor for the conditions in which in will be used.

SUMMARY OF THE INVENTION

It is an object of the present invention to provide a flow sensor suitable for automotive applications and manufacturable by automotive production techniques.

It is another object of this invention that such a flow sensor has a relatively uncomplicated and rugged construction in which the primary sensing component is formed by a single silicon chip, such that the sensor can be mass produced using batch processing techniques.

It is a further object of the present invention that the sensitivity of such a flow sensor can be readily modified during fabrication in order to optimize the sensor for the flow conditions in which it will be used.

It is yet a further object of this invention that such a flow sensor enables the presence of signal conditioning circuitry on the same silicon chip as the primary sensing component.

In accordance with a preferred embodiment of this invention, these and other objects and advantages are accomplished as follows.

A silicon flow sensor is provided that has an uncomplicated design and construction, and yet is characterized as exhibiting a desirable level of sensitivity for use in automotive applications. In particular, the primary sensing component is preferably formed by a single silicon chip on which associated signal conditioning and compensating circuitry can be provided. The construction of the flow sensor is such that its sensitivity can be readily modified during its manufacture in order to optimize the sensor for its intended use.

The sensor of this invention is generally composed of a silicon chip having a base region from which a vane is cantilevered so as to be adapted to deflect in either of two directions when impinged by fluid flow. A beam region is present intermediate the vane and the base region on which a strain sensing element is present, such that strain occurring in the beam region as a result of vane deflection is sensed to indicate the degree to which the vane is deflected. The ruggedness of the sensor can be promoted by providing stops that limit deflection of the vane relative to the base region.

A particularly advantageous aspect of the sensor is that it is configured to enable its sensitivity to be affected by various modifications achievable during processing. For example, sensitivity can be affected by the presence of one or more through-holes in the vane. The sensitivity and linearity of the sensor can be further modified by fabricating the chip to include a frame disposed along a peripheral edge of the vane, such that a gap having a predeterminable width is present therebetween. The sensitivity of the sensor can be also readily effected by modifying the length and thickness of the beam region.

Another advantageous aspect of this invention is that the strain output resulting from deflection of the vane is extremely linear, which simplifies the need for further signal processing. Yet, the chip can be of sufficient size to accommodate signal conditioning or temperature compensation circuitry, as well as other sensing elements including pressure sensing diaphragms.

In view of the above, it can be seen that the sensor of this invention is relatively uncomplicated and rugged, making the sensor particularly well suited for automotive applications. The primary and essential component of the sensor is a single silicon chip, which can be readily manufactured using batch processes so as to be cost effective, and then packaged within a housing or sensor module without significantly complicating the manufacture of the sensor. The reliance on a single sensing structure makes possible a small sensor, such that the presence of the sensor can have a minimal effect on the flow dynamics of the fluid being sensed, though it is foreseeable that multiple sensors could be defined in a single chip in order to extend the flow sensing range capability. In addition, the silicon vane of the sensor is adapted to be bidirectionally deflected, which enhances the versatility of the sensor. Furthermore, the ability to selectively alter the sensitivity of the sensor during processing also enhances the versatility of the sensor, enabling a basic sensor design to be adapted to various applications having significantly different flow conditions.

Other objects and advantages of this invention will be better appreciated from the detailed description thereof, which follows.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENTS

Figure 1:
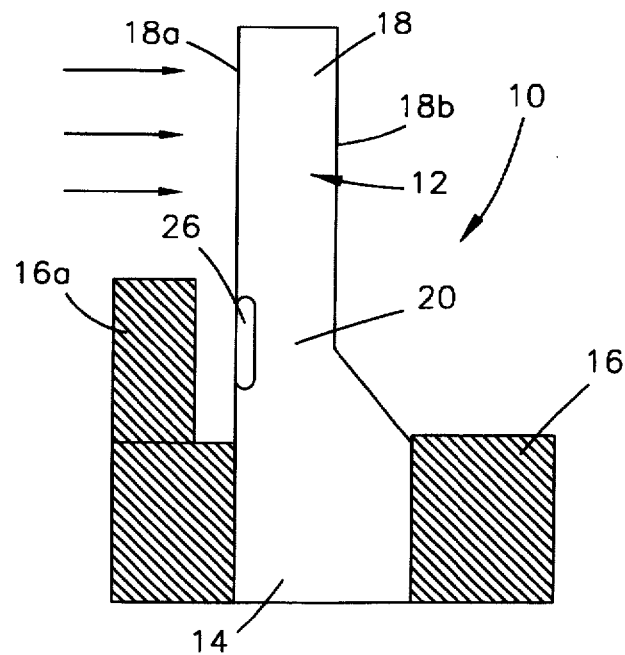
FIGS. 1 and 2 are side and front views, respectively, of a silicon flow sensor in accordance with a first embodiment of this invention.

A flow sensor 10 in accordance with a first embodiment of this invention is shown in cross-section in FIG. 1. The sensor 10 is generally represented as being formed by a single silicon chip 12 whose outer dimensions are typical for silicon wafer chips, generally on the order of about 4000 micrometers by about 6000 micrometers by about 380 micrometers in thickness. The chip 12 has a base 14 secured by a housing 16, which can generally be of any suitable construction and material capable of adequately supporting and anchoring the chip 12 within its intended operating environment. With additional reference to FIG. 2, which is a plan view the chip 12 as seen when isolated from the housing 16, the chip 12 can be seen to define a vane 18 cantilevered from the base 14. The vane 18 is adapted to be deflected in response to fluid flow that impinges either of its broader surfaces 18a and 18b, such that the sensor 10 is capable of bidirectional operation. As shown, one of the broader surfaces 18a of the vane 18 is contiguous and coplanar with a surface of the base 14, though other configurations are foreseeable.

Figure 2:
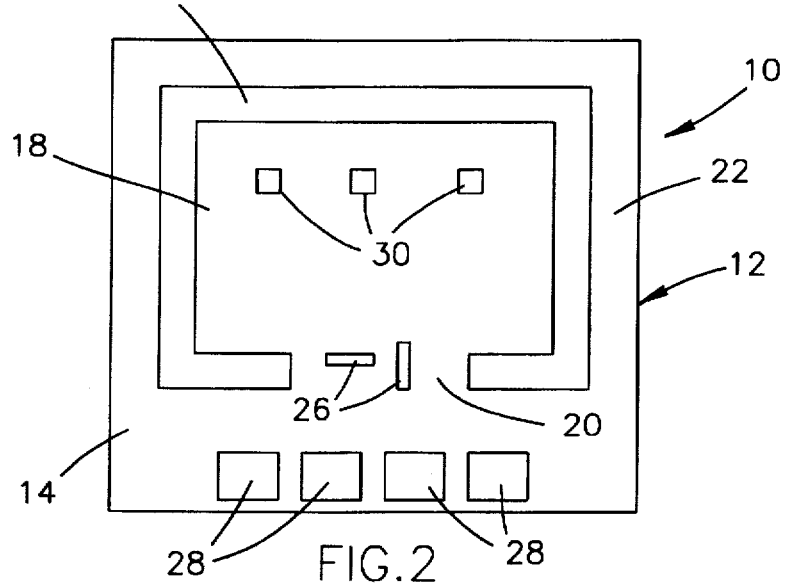

The vane 18 is preferably micromachined from the chip 12 using any suitably micromachining technique so as to be surrounded by a frame 22, such that a gap 24 having a predeterminable width is present therebetween. In addition, the vane 18 is preferably micromachined such that its thickness in the direction of fluid flow is thinner than that of the base 14. A beam 20 is defined by a transition region of the chip 12 where the thickness of the chip 12 changes between the vane 18 and the base 12. This transition reduces stress risers in the chip 12, and establishes a region in the beam 20 in which deflection of the vane 18 will be localized, making the beam 20 highly suited as a location for sensing deflection of the vane 18 with a strain sensing element 26, as shown in FIGS. 1 and 2. The beam 20 is preferably protected with a barrier 16a from being directly impinged by the fluid being sensed by the vane 18, as shown in FIG. 1, so as to avoid erosion of the beam 20 and the strain sensing element 26. While FIG. 2 illustrates a single-beam configuration for the sensor 10, other beam designs could be employed, such as four-beam, two-beam and folded-beam designs.

FIG. 2 illustrates the use of a pair or a set of four piezoresistors formed on the beam 20 as the strain sensing elements 26 for sensing deflection of the vane 18. As is known in the art, piezoresistive sensing elements are well suited for use as the strain sensing element for a silicon pressure sensor or motion-sensor. In addition, piezoresistors are highly suitable as the strain sensing elements 26 of this invention, in that they can be readily integrated with appropriate adjusting circuitry in a monolithic silicon integrated circuit. The piezoresistors are preferably formed in a doped epitaxial layer formed on the surface of the chip 12, though for high temperature applications the piezoresistors can be formed within deposited films such as polysilicon or a metal. While piezoresistive sensing elements are preferred, other strain sensing elements, such as strain gauges, could be used. Furthermore, it is foreseeable that the deflection of the vane 18 could be sensed using other techniques, such as capacitive sensing.

Metal bond pads 28 are shown as being provided on the base 14 of the chip 12 through which the input power and output signals of the strain sensing elements 26 are transmitted to and from the sensor 10 for signal conditioning and processing. For enhanced reliability and corrosion resistance, the bond pads 28 and runners (not shown) interconnecting the piezoresistors to the bond pads 28 should be formed from polysilicon or a noble metal such as gold, platinum or palladium, or should be shielded from the gas or liquid being sensed. To achieve the latter, the housing 16 can be designed to protect the bond pads 28 and runners, or the sensor 10 can include a plastic or wax layer that covers the bond pads 28 and runners, as is done with piezoresistive pressure sensors known in the art.

As would be expected, the degree that the vane 18 will deflect in response to a given rate of fluid flow is influenced by the size of the vane 18. According to this invention, the size of the vane 18 can be readily tailored during micromachining of the chip 12 to achieve a size suitably adapted for the operating environment of the sensor 10. Additionally, the width of the gap 24 surrounding the vane 18 also influences deflection of the vane 18. Greater widths will render the vane 18 less sensitive to flow, while narrower widths will increase sensitivity. In practice a vane 18 having planar dimensions of about 1500 by 1500 micrometers has been found practicable when used with a gap 24 of about 25 micrometers. However, it is foreseeable that the size of the vane 18 and gap 24 could vary greatly from these dimensions and still perform well.

Advantageously, the vane configuration shown in FIG. 2 permits various other techniques for modifying its sensitivity. For example, the width and thickness of the beam 20 and the number of beams 20 can each be readily tailored during processing of the chip 12 to alter the sensitivity of the sensor 10. The width of the beam 20 must generally be optimized in relation to the size of the vane 18 in order to avoid the vane 18 from becoming unstable within the range of flow rates for the fluid to which it will be exposed. Furthermore, the thickness of the epitaxial layer in which the strain sensing elements 26 are formed can also be tailored to have an intentional affect on sensitivity, with thicker epitaxial layers enabling the use of the sensor 10 in higher flow applications and with more viscous fluids. Finally, as shown in FIG. 2, holes 30 can be micromachined directly through the vane 18 in order to further alter sensitivity, with fewer and/or smaller holes generally increasing the sensitivity of the sensor 10.

Figure 3:
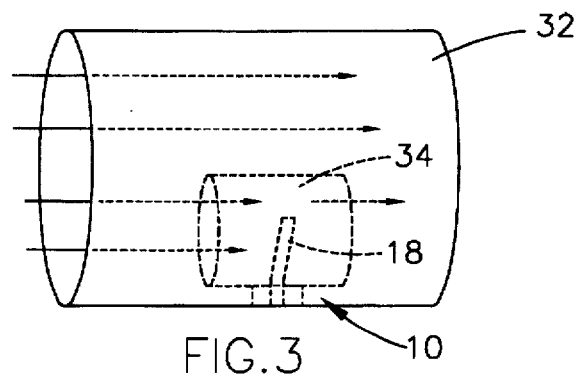
FIG. 3 shows the flow sensor of FIGS. 1 and 2 assembled within a module that is placed in an air duct.

For illustrative purposes, FIG. 3 shows the sensor 10 of this invention disposed within an automobile's air intake duct 32. The sensor 10 is shown housed within a module 34 that includes a passage into which the vane 18 projects. The module 34 can be mounted directly to the wall of the duct 32, and can be readily sized to achieve suitably air flow through the passage without unnecessarily restricting air flow through the duct 32. Alternatively, the sensor 10 could be mounted directly within the duct 32.

Figure 4:
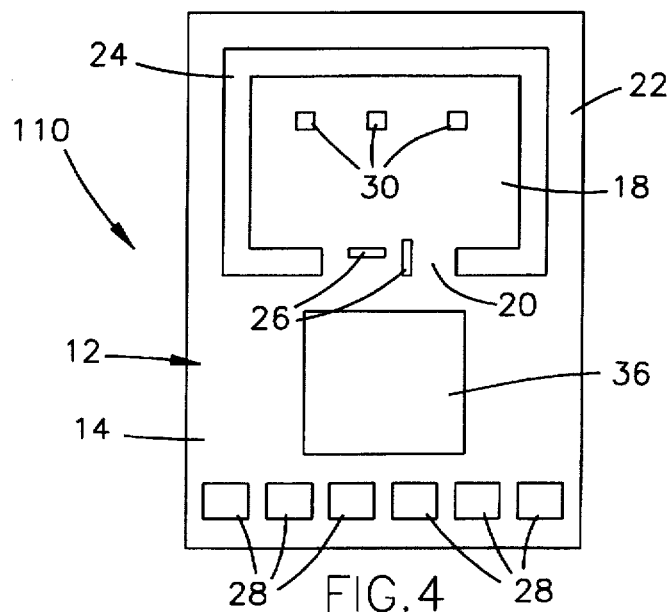
FIG. 4 is a front view of the flow sensor of this invention in combination with a pressure sensor on a single silicon chip, in accordance with a second embodiment of this invention.
Figure 5:
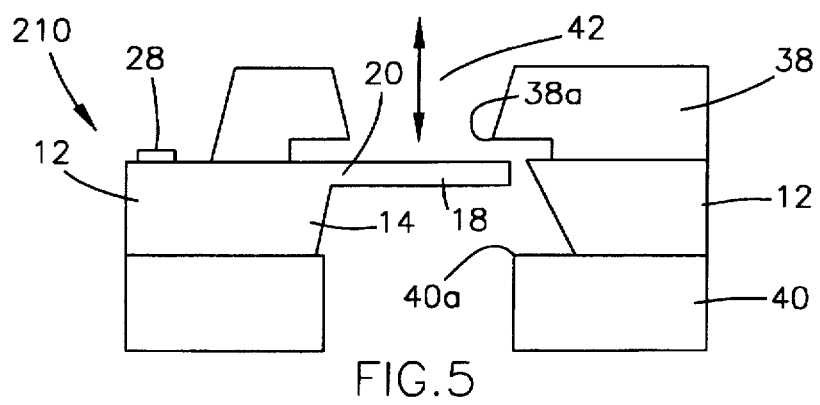
FIG. 5 is a side views of a silicon flow sensor incorporating motion stops in accordance with a third embodiment of this invention.
Figure 6:
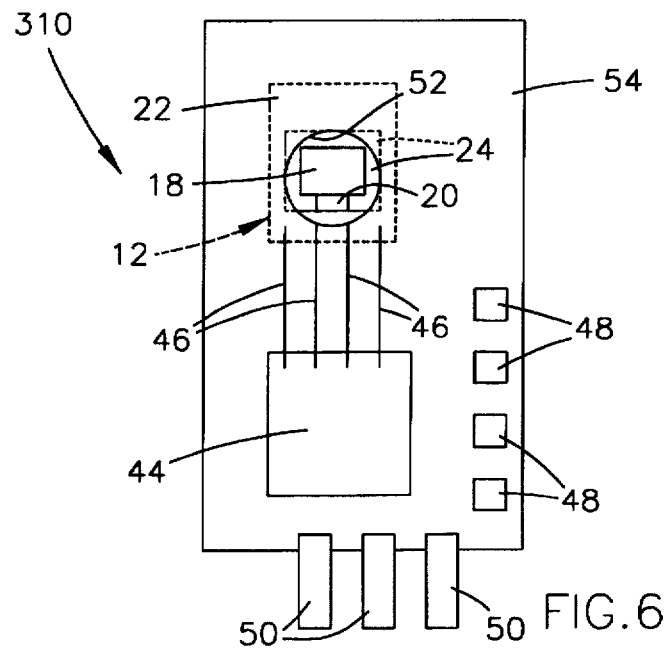
FIG. 6 is a front view of the flow sensor of this invention in combination with control and compensation circuitry on a package substrate, in accordance with a fourth embodiment of this invention.

Variations of the sensor 10 shown in FIGS. 1 and 2 are represented in FIGS. 4 through 6. FIG. 4 illustrates a sensor 110 having the basic vane configuration shown in FIG. 2 in combination with a pressure sensor diaphragm 36, all of which is formed on the same chip 12. The diaphragm 36 can be micromachined in the chip 12 in a conventional manner as an absolute or differential sensing element, and with or without a capping chip (not shown) for enclosing a cavity (not shown) that results from the presence of the diaphragm 36 in the chip 12, all of which is conventional in the art of silicon pressure sensors. In this embodiment, additional metal bond pads 28 are required to serve both the strain sensing elements 26 of the flow sensor portion of the sensor 110 and strain or capacitive-sensing elements required for the pressure sensing portion of the sensor 110.

FIG. 5 represents yet another embodiment of this invention, in which wafer-to-wafer bonding is employed to improve the reliability and manufacturability of a silicon flow sensor 210 that incorporates the sensor components shown in FIGS. 1 and 2. The sensor 210 is shown as including a top capping chip 38 and a bottom capping chip 40 that can be bonded to the chip 12 in any suitable manner. The top and bottom capping chips 38 and 40 define a passage 42 through which fluid flows to and from the vane 18 of the sensor 210. The top and bottom capping chips 38 and 40 also provide motion stops 38a and 40a, respectively, which prevent high flow bursts through the passage 42 from damaging the vane 18. Advantageously, the passage 42 formed by the capping chips 38 and 40 can be tailored to influence the flow to and around the vane 18, and even optimize the flow pattern over the vane 18. For example, entrance to the passage 42 can be restricted by grooves, slits and/or holes that allow fluid to enter the passage 42, and potentially impinge only a limited portion of the vane 18, while excluding large fluid-borne particles and other undesirable debris.

Finally, FIG. 6 illustrates a flow sensor 310 having the basic sensor configuration shown in FIG. 2 in combination with a thick film integrated circuit (IC) 44. The sensor 310 and IC 44 may be formed on the same chip 12 or, as shown, formed on separate chips housed within a single package 54. The IC 44 can be a signal processor, temperature compensator, or other control chip such as a microprocessor. If piezoresistors are used as the strain sensing elements 26, they will typically be connected to a suitable signal processing circuitry for measuring the deflection of the vane 18. Furthermore, piezoresistors often require calibration to compensate for the variations that tend to occur during manufacturing between individual strain sensing elements and signal conditioning circuitry during manufacturing. To provide for this compensation, it is advantageous to include either separately or as part of the integrated circuit, a conditioning network that permits customized adjustment of the output parameters for the individual flow sensor. Conductors 46 are employed to electrically interconnect the sensor 310 with the IC 44. In addition, the package 54 is preferably equipped with electrical programming pads 48 by which the IC can be appropriately programmed, and plug connectors 50 with which the input power can be transmitted to the sensor 310 and the conditioned and processed output signal of the sensor 310 can be transmitted to the appropriate associated control system. An opening 52 formed in the package 54 allows fluid to flow through the package and over the vane 18.

Notably, forming the sensor 310 to include the frame 22 makes the sensor module assembly process much easier, in that the vane structure is not directly handled during the die pick-and-place operation. The frame 22 is also used to attach the sensor 310 over the opening 52 in the package 54. An adhesive (not shown) is applied round the opening 52 such that the frame 22 is directly contacted by the adhesive. As such, the frame 22 serves to mount the sensor chip in the package 54, thereby preventing the adhesive from contacting the vane 18 or beam 20 in order to ensure proper operation of the sensor 310. The adhesive should be relatively soft (i.e., a low Young's Modulus) and be compatible with the fluid being sensed. A low Young's Modulus is required to prevent packaging stresses from interfering with the piezoresistors on the beam 20.

Figure 7:
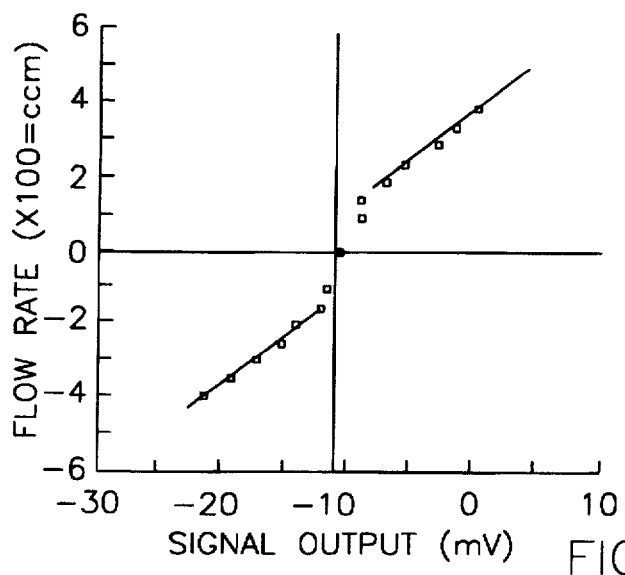
FIGS. 7 through 9 are graphs showing the signal output response of the flow sensor of FIGS. 1 and 2.
Figure 8:
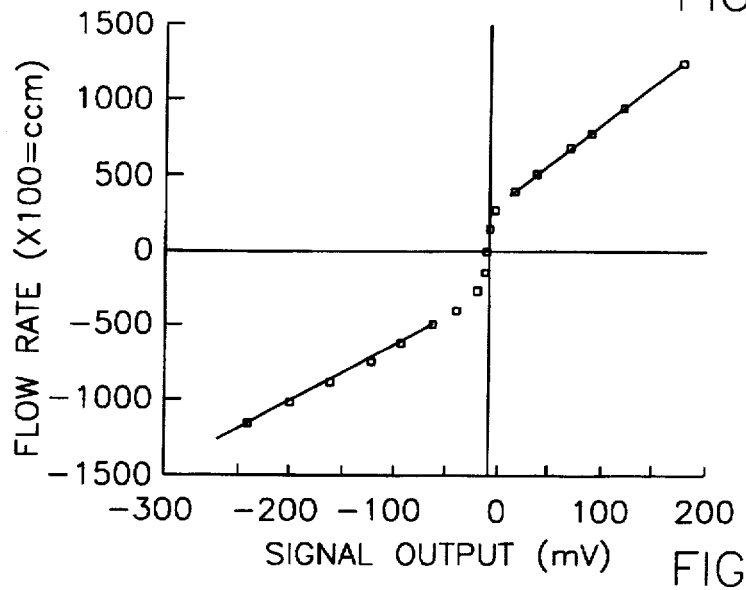
Figure 9:
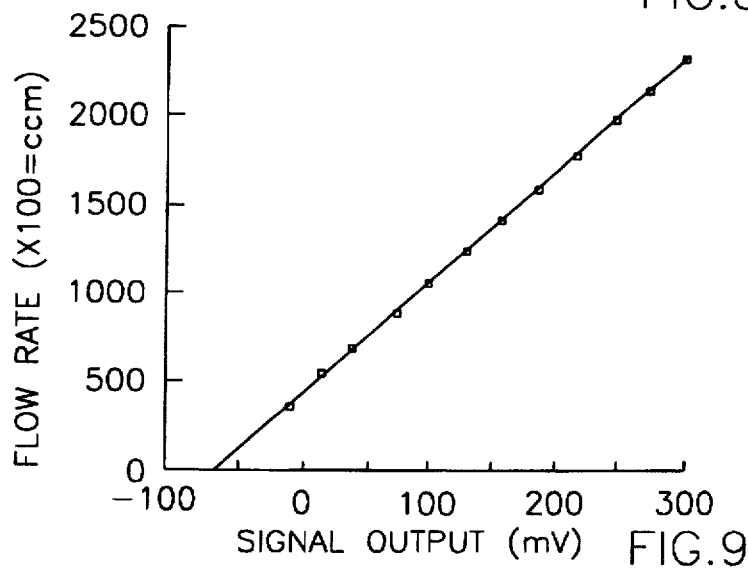

FIGS. 7 through 9 graphically represent the signal output response of flow sensors configured in accordance with the embodiment of FIG. 6. FIG. 7 is indicative of the extreme linearity of the sensor for air flow rates above about 150 cubic centimeters per minute ($cc^3$/min). The particular sensor tested to produce the results shown in FIG. 7 had a beam thickness of about twelve micrometers. FIG. 8 represents similar linearity for a sensor configured in accordance with the embodiment of FIG. 6, but adapted for higher flow conditions. Excellent linearity is apparent from the results represented in FIG. 8 for flow rates of between about 500 and about 1500 $cc^3$/min. Notably, the results depicted in FIGS. 7 and 8 also illustrate the desirable bidirectional capability of the sensor design of this invention, in which flow impinging either broad surface 18a or 18b produces a linear output.

Finally, FIG. 9 illustrates the extreme linearity of the output signal of a flow sensor configured in accordance with FIG. 6. The output signal is shown as being highly linear from a flow rate of about 150 $cc^3$/min to about 2500 $cc^3$/min. The maximum flow rate tested was limited only be the structural capability of the sensor tested, and not the stability of the vane 18 or the linearity of the sensor output.

From the above, it can be seen that a particularly advantageous aspect of a flow sensor configured in accordance with this invention, is that its output signal resulting from deflection of the vane 18 is extremely linear, which simplifies the need for further signal processing. By comparing the results represented in FIGS. 7 and 8, it is also apparent that linearity is unaffected by modifications to the sensor in order to alter the sensitivity. Advantageously, a sensor configured in accordance with this invention can be readily configured to enable its sensitivity to be modified during processing of the chip in which the sensor is formed. For example, sensitivity can be affected by varying the size of the vane 18, the width and thickness of the beam 20, the presence of one or more through-holes in the vane 18, and by forming the sensor to include a frame 22 that surrounds the vane 18 such that a gap having a predeterminable width is present therebetween.

Another advantageous aspect of this invention is that a sensor configured in accordance with this invention is very small (the size of a typical IC silicon chip), relatively uncomplicated and rugged, making such sensors particularly well suited for automotive applications. The primary and essential component of the sensor is a single silicon chip, which can be readily manufactured using batch processes so as to be cost effective, and then packaged within a housing or sensor module without significantly complicating the manufacture of the sensor. The reliance on the vane 18 as the single sensing structure of the sensor makes possible a small sensor, such that the presence of the sensor will have a minimal effect on the flow dynamics of the fluid being sensed. In addition, the silicon vane of the sensor is adapted to be bidirectionally deflected, which enhances the versatility of the sensor. Furthermore, the ability to selectively alter the sensitivity of the sensor during processing also enhances the versatility of the sensor, enabling a basic sensor design to be adapted to various applications having significantly different flow conditions.

Finally, the sensor design of this invention provides a small compact assembly which is amenable to automotive production techniques, yet enables other sensing structures and signal conditioning or temperature compensation circuitry to be incorporated on the same chip that forms the flow sensor. As such, sensors configured in accordance with this invention are characterized by an efficient use of material and packaging. Because of its all-silicon design, sensors of this invention are also useful in applications where the use of prior art flow sensors would be inappropriate. For example, the silicon flow sensor of this invention can be used to sense the flow of combustible fluids, an application incompatible with prior art hot-wire flow sensors.

While our invention has been described in terms of a preferred embodiment, it is apparent that other forms of the device could be adopted by one skilled in the art. By example, it is apparent that these teachings could be used with alternative materials and processing techniques. It is also apparent that the specific size, shape and overall appearance of a sensor configured within the scope of this invention could vary considerably from that shown in the Figures. Accordingly, the scope of our invention is to be limited only by the following claims.

The embodiments of this invention in which an exclusive property or privilege is claimed are defined as follows:

1. A silicon flow sensor having a silicon chip comprising:
   a base region;
   a vane cantilevered from the base region and adapted to project into a fluid flowstream so as to deflect when impinged by fluid flow;
   a beam region intermediate the vane and the base region; and
   means for sensing the deflection of the vane relative to the base region as a result of being impinged by fluid flow.

2. A silicon flow sensor as recited in claim 1 further comprising at least one through-hole present in the vane.

3. A silicon flow sensor as recited in claim 1 wherein the base region has a thickness greater than a thickness of the vane.

4. A silicon flow sensor as recited in claim 1 wherein the chip further comprises a frame disposed along a peripheral edge of the vane so as to form a gap therebetween.

5. A silicon flow sensor as recited in claim 1 further comprising an integrated circuit disposed on the chip and electrically interconnected with the deflection sensing means.

6. A silicon flow sensor as recited in claim 1 further comprising a pressure sensing element disposed on the chip.

7. A silicon flow sensor as recited in claim 1 further comprising means for limiting deflection of the vane.

8. A silicon flow sensor as recited in claim 1 further comprising means for defining a passage to the vane, the passage being adapted to restrict flow to the vane.

9. A silicon flow sensing element formed by a single silicon chip, the flow sensing element comprising:
   a base region having a surface;
   a vane cantilevered from the base region and adapted to deflect relative to the base region when impinged by fluid flow, the vane having a surface contiguous with the surface of the base region;
   a beam region intermediate the vane and the base region;
   means for sensing strain in the beam region occurring as a result of the vane being deflected relative to the base region; and
   means defined by the chip for affecting the sensitivity of the vane to fluid flow.

10. A silicon flow sensing element as recited in claim 9 wherein the strain sensing means comprises at least one piezoresistor.

11. A silicon flow sensing element as recited in claim 9 wherein the sensitivity affecting means comprises at least one through-hole in the vane.

12. A silicon flow sensing element as recited in claim 9 wherein the sensitivity affecting means comprises a frame disposed along a peripheral edge of the vane so as to form a gap therebetween, the gap being adapted to affect the sensitivity of the vane.

13. A silicon flow sensing element as recited in claim 9 wherein the base region has a thickness in a direction normal to the surface of the base region that is greater than a thickness of the vane in a direction normal to the surface of the vane.

14. A silicon flow sensing element as recited in claim 9 wherein the surface of the vane is coplanar to the surface of the base region.

15. A silicon flow sensing element as recited in claim 9 further comprising a pressure sensing element formed with the single silicon chip.

16. A silicon flow sensing element as recited in claim 9 further comprising a temperature compensating circuitry electrically interconnected with the strain sensing means.

17. A silicon flow sensing element as recited in claim 9 further comprising means for limiting deflection of the vane.

18. A silicon flow sensing element as recited in claim 9 further comprising a capping chip bonded to the chip, the capping chip defining a passage to the vane that is adapted to restrict flow to the vane.

19. A bidirectional piezoresistive silicon flow sensor including a single silicon chip within a sensor package, the chip comprising:
   a base region having a thickness in a direction of fluid flow;
   a vane cantilevered from the base region and adapted to deflect when impinged by fluid flow, the vane having a thickness in the direction of fluid flow, the thickness of the vane being less than the thickness of the base region, the vane having a width transverse to the direction of fluid flow;
   a beam region intermediate the vane and the base region, the beam having a width transverse to the direction of fluid flow, the width of the beam being less than the width of the vane;
   a piezoresistor disposed on the beam region for sensing strain occurring in the beam region as a result of the vane being deflected relative to the base region in the direction of fluid flow; and
   a frame disposed along a peripheral edge of the vane so as to form a gap therebetween, the gap being adapted to affect the sensitivity of the vane, the frame securing the chip to the sensor package.

* * * * *